US010557256B2

(12) United States Patent
Steigerwald et al.

(10) Patent No.: US 10,557,256 B2
(45) Date of Patent: Feb. 11, 2020

(54) HOLDING TANK FOR PORTABLE TOILET

(71) Applicant: ADCO Umweltdienste Holding GmbH, Ratingen (DE)

(72) Inventors: Norbert Steigerwald, Schoellkrippen (DE); Andre Bonewitz, Friedewald (DE)

(73) Assignee: ADCO UMWELTDIENSTE HOLDING GMBH, Ratingen (DE)

(*) Notice: Subject to any disclaimer, the term of this patent is extended or adjusted under 35 U.S.C. 154(b) by 0 days.

(21) Appl. No.: 16/120,341

(22) Filed: Sep. 3, 2018

(65) Prior Publication Data

US 2019/0136497 A1     May 9, 2019

(30) Foreign Application Priority Data

Sep. 14, 2017    (EP) ..................................... 17191032

(51) Int. Cl.
| | |
|---|---|
| *E03D 7/00* | (2006.01) |
| *E03D 5/016* | (2006.01) |
| *E03D 5/00* | (2006.01) |
| *E03D 1/00* | (2006.01) |
| *E03B 1/04* | (2006.01) |

(52) U.S. Cl.
CPC ............... *E03D 7/00* (2013.01); *E03D 1/003* (2013.01); *E03D 5/003* (2013.01); *E03D 5/016* (2013.01); *E03B 2001/045* (2013.01)

(58) Field of Classification Search
CPC ....................................................... E03D 5/016
USPC ............................................................. 4/664
See application file for complete search history.

(56) References Cited

U.S. PATENT DOCUMENTS

| | | | | |
|---|---|---|---|---|
| 3,934,275 A | * | 1/1976 | Bishton, Jr. ............. | E03D 5/016 4/317 |
| 4,050,102 A | * | 9/1977 | Kemper .................. | E03D 5/016 4/317 |

FOREIGN PATENT DOCUMENTS

DE             2441368 A1 * 8/1975 ............. E03D 5/016

* cited by examiner

*Primary Examiner* — Lori L Baker
(74) *Attorney, Agent, or Firm* — Andrew Wilford

(57) ABSTRACT

A holding tank for a sanitary installation carrying a sanitary fixture receives fecal matter or wastewater from the sanitary fixture of the sanitary installation and has at least one inlet and at least one outlet. At least one suction float in the holding tank floats on the liquid therein and forms with at least one suction chamber opening downward through a suction screen into the tank. An extraction line connected to at least one suction pump opens into the liquid in the suction chamber for withdrawing the liquid from the holding tank through the suction float and for recycling the extracted water for use as a flushing fluid for the sanitary fixture of the sanitary installation.

20 Claims, 4 Drawing Sheets

HOLDING TANK FOR PORTABLE TOILET

FIELD OF THE INVENTION

The invention relates to a holding tank for a sanitary installation where the holding tank is used to receive the fecal matter and/or the wastewater from at least one sanitary fixture of the sanitary installation. The invention also relates to a portable toilet with at least one holding tank and to a method of recycling flushing water in a sanitary installation.

BACKGROUND OF THE INVENTION

Holding tanks of the type mentioned above are known as a matter of principle in various embodiments and are used in sanitary installations, for example, especially in portable sanitary installations. Portable sanitary installations are set up for a certain period of time at events such as trade fairs and at construction sites or the like and later transported away again. The sanitary installations or the portable sanitary installations usually cannot be easily connected to a wastewater system or to the sewage system at the site, for which reason they are often equipped with a holding tank. In the holding tanks that are known from practice, however, it has proven to be disadvantageous that these tanks reach a high fill level relatively quickly as a result of receiving fecal matter and flushing water or flushing fluid from the sanitary fixtures and must therefore be emptied relatively frequently on-site by qualified personnel.

In principle, it is also already known and environmentally advantageous to reuse the liquid collected in the holding tank as flushing water or flushing fluid. Appropriate filters and suction devices are used for this purpose. In practice, this often results in the problem that the suction devices provided in or on the holding tanks are clogged by the solid components in the holding tank and/or of solid components and suspended particles being sucked up as well. In addition to the feces themselves, these solid constituents may also include toilet paper, paper towels, or the like that get into the holding tank. As a result, suction is impaired or the extraction system damaged, resulting in commensurately high maintenance. So far, no satisfactory solution has been found that enables a holding tank or a sanitary installation with such a holding tank to be used for a sufficient period of time without intermediate emptying or maintenance by qualified personnel. Another frequent drawback of the sanitary installations and portable sanitary installations that are known from practice and equipped with a holding tank is limited flexible applicability, since the sanitary installations usually require an external power supply, particularly if pumps are used to reuse the liquid from the holding tank. A need for improvement exists in this regard.

OBJECT OF THE INVENTION

The object of the invention is to provide a holding tank of the type described above in which the drawbacks described above can be avoided in an effective and functionally reliable manner and, in particular, that can be used for a sufficiently long period of time at the place of use without intermediate emptying and/or maintenance by qualified personnel.

Moreover, another object of the invention is to provide a portable toilet with a holding tank that meets all requirements and has flexible applicability.

Finally, an object of the invention is to provide a method of recycling flushing water in a sanitary installation in which the described drawbacks can be avoided.

SUMMARY OF THE INVENTION

The instant invention attains these objects with a holding tank for a sanitary installation, where the holding tank receives fecal matter and/or wastewater from at least one sanitary fixture of the sanitary installation and has at least one inlet and at least one outlet, at least one suction float is provided in the holding tank with at least one suction chamber and at least one suction screen, at least one extraction line connected to at least one suction pump is connected to the suction chamber, and liquid can be extracted from the holding tank through the suction float and/or by the extraction line and then can be used as a flushing fluid for at least one sanitary fixture of the sanitary installation.

It lies within the scope of the invention if the sanitary installation is a portable sanitary installation, such as a portable toilet or a portable sanitary trailer, for example. In principle, however, the sanitary installation can also be a sanitary installation that is permanently installed to some extent, such as a toilet cubicle in rest areas or at a campsite, where the sanitary installation is not connected to a wastewater system or sewage system and therefore requires a holding tank. In the context of the invention, "sanitary fixture" refers particularly to a toilet bowl, a urinal, a urinal trough, or the like, with the sanitary fixture preferably being a flushable sanitary fixture.

The holding tank according to the invention is used particularly for receiving fecal matter and/or wastewater from at least one such sanitary fixture. For this purpose, the at least one inlet of the holding tank is preferably connected to at least one sanitary fixture. According to the invention, the liquid in the holding tank can be evacuated by the at least one suction float and can be used as flushing fluid for at least one sanitary fixture of the sanitary installation. The extracted liquid is advantageously reused, as it were, whereby undesirable frequent emptying of the holding tank can be avoided. Especially preferably, the holding tank is emptied only once at the end of the service period, and this emptying can be advantageously performed at the supplier or at a service center.

In order to put the holding tank into the normal use position, a certain amount of process water is prefilled into the holding tank. The term "process water" refers here and in the following to clean drinking water. In the manner described above, flushing water is available even for the initial uses of the at least one sanitary fixture; in addition, air is also prevented from getting into the extraction system and/or suction pump via the suction float and/or the extraction line due to insufficient liquid in the holding tank. In the context of the invention, the "normal use position" of the holding tank thus refers particularly to the state in which the tank can be used and/or is ready for use in a sanitary installation, i.e. preferably to a state in which the holding tank is primed with a certain amount of liquid. In this context, it lies within the scope of the invention if the process water is already introduced into the holding tank at the supplier or at a service center, and the holding tank is put immediately in the normal use position at the place of use and thus preferably requires no additional water supply. In principle, however, it is also possible to introduce the priming water into the holding tank at the place of use. One especially preferred embodiment of the invention is characterized in that between 5% and 40%, preferably 10% to 35%, especially preferably 15% to 30% of the total internal volume of the holding tank is filled with the priming water in order to put the holding tank in the normal use position. The total internal volume of the holding tank refers particularly to the capacity of the holding tank. The total internal volume or the capacity of the holding tank is preferably between 50 L and 1000 L, more preferably between 300 L and 800 L, especially preferably between 500 L and 700 L. In principle, the total internal volume or the capacity of the holding tank can also be even larger or smaller. In particular, the total internal volume or capacity of the holding tank is selected as a function of the number of sanitary fixtures and/or how long the holding tank will be used.

According to a highly preferred embodiment of the invention, the sanitary installation is a portable toilet. For example, such a portable toilet can have a standard housing according to ISO standards that is transported to the place of use and placed there, or it can be a trailer composed of a chassis and a permanently installed housing that is hitched to a motor vehicle, transported to the place of use, and parked there as a complete trailer.

Advantageously, the portable toilet has at least one stall, and at least one sanitary fixture is preferably provided in this at least one stall. It is recommended that a separate extraction line be connected to the suction chamber of the suction float for each stall of the portable toilet and/or for each sanitary fixture. This embodiment is based on the discovery that, during use of the stall or of a sanitary fixture provided in the stall, liquid can be sucked out of the holding tank specifically for this stall or sanitary fixture and that, in particular, a plurality of stalls can be used at the same time, and/or a plurality of sanitary fixtures can be flushed and/or supplied with flushing water simultaneously.

According to a highly recommended embodiment of the invention, the suction screen is provided on the side of the suction float that faces downward toward the bottom wall of the holding tank and preferably forms at least part of the wall of the suction float turned toward the bottom wall of the holding tank; especially preferably, the suction screen forms the wall of the suction float that faces toward the bottom wall of the holding tank. In the context of the invention, "bottom wall of the holding tank" refers particularly to the bottom wall or the underside of the holding tank when the holding tank is in the normal use position. It is advantageous for at least one flush line to be connected to the suction chamber of the suction float. In addition to the at least one extraction line, at least one separate flush line is thus preferably connected to the suction chamber of the suction float. It is recommended that this flush line be used to flush the suction chamber and/or suction screen. It is recommended that a liquid, such as water and/or a cleaning fluid, for example, be conveyed through the flush line into the suction chamber and enter the holding tank through the suction screen from there. While the at least one extraction line is used to extract liquid from the holding tank, particularly by at least one suction pump, the at least one flush line is preferably used to introduce liquid into the holding tank. This embodiment is based on the discovery that, through the introduction of liquid through the at least one flush line into the suction chamber of the suction float and the subsequent flow of liquid through the suction screen into the holding tank, solid components that are stuck to the underside of suction screen and/or have settled within the suction screen can be removed. Preferably, flushing of the suction chamber and/or of the suction screen is performed during the introduction of the process water and/or the priming water into the holding tank, and the priming water is especially preferably introduced via the flush line. Solid components that have settled on the underside of the suction screen and/or within the suction screen during a previous use of the holding tank can then be removed and/or flushed out. In principle, however, the suction chamber and/or the suction screen can also be flushed out at another time via the flush line, for example in the event of undesirable blockage of the suction screen.

According to a proven embodiment of the invention, the suction screen has meshes with a mesh size of from 0.1 mm to 5.0 mm, preferably from 0.2 mm to 2.0 mm, especially preferably from 0.3 mm to 1.0 mm. In the context of the invention, the mesh of the suction screen refers particularly to an opening of the suction screen. It is recommended that the suction screen be a wire mesh or a perforated plate or the like. The meshes or openings of the suction screen can be designed in different ways and have a circular or oval or rectangular or square shape, for example. In the context of the invention, "mesh size" refers particularly to the greatest dimension of a mesh of the suction screen or the largest diameter of a mesh of the suction screen. Advantageously, the mesh size refers to the average maximum dimension of the meshes of the suction screen or the average largest diameter of the meshes of the suction screen. It is recommended that the mesh size of suction screen be selected such that the solids and/or the suspended particles remain in the holding tank due to the filtering effect of the suction screen when liquid is extracted from the holding tank.

One highly recommended embodiment of the invention is characterized in that the suction float has at least one float chamber. It is recommended that the at least one float chamber be filled or substantially filled with air. However, it also lies within the scope of the invention if the float chamber is filled or substantially filled with other materials, such as fillers, for example, that preferably have a lower density than water. According to a proven embodiment of the invention, the float chamber is embodied such that, when the holding tank is in the normal use position, the suction float projects with a proportion of from 5% to 95% of its total height H from the liquid surface of the holding tank. In the context of the invention, "total height H of the suction float" refers particularly to the largest dimension of the suction float perpendicular to the bottom wall of the holding tank or perpendicular to the liquid surface when the holding tank is in the normal use position. In the normal use position of the holding tank, the suction float preferably projects with a proportion of from 20% to 85%, especially preferably with a proportion of from 35% to 80%, and very especially preferably with a proportion of from 50% to 75% of its total height H from the liquid surface of the holding tank. The at least one float chamber is advantageously provided above the suction chamber relative to the bottom wall or the liquid surface of the holding tank. At least part of the float chamber then projects particularly from the liquid surface of the holding tank and at least part of the suction chamber is located below the liquid surface of the holding tank and projects down into the liquid. Since liquid can preferably penetrate into the suction chamber through the suction screen, the suction chamber is then preferably filled with water or liquid approximately up to the proportion of the total height H of the suction float that is located below the liquid surface of the holding tank. In this context, it lies within the scope of the invention for a proportion of from 5% to 95% of the total internal volume of the suction float to project from the liquid surface of the holding tank. A proportion of from 20% to 85%, especially preferably a proportion of from 35% to 80%, and very especially preferably a proportion of from 50% to 75% of the total internal volume of the suction float projects up from the liquid surface of the holding tank. In this context, "total internal volume of the suction float" refers particularly to the sum of the internal volume of the at least one suction chamber and the internal volume of the at least one float chamber. It is recommended that at least part of the internal volume of the float chamber project from the liquid surface of the holding tank and that at least part of the internal volume of the suction chamber be located below the liquid surface of the holding tank and project into the liquid, as it were.

Advantageously, the float chamber is a spatially separated from the suction chamber and the float chamber gives the suction float some buoyancy. It is therefore advantageously not possible with this design for liquid from the suction chamber to penetrate into the float chamber. Since the liquid in the holding tank is preferably able to penetrate into the suction chamber through the suction screen, that particular portion of the total internal volume of the suction float or of the suction chamber that is located below the liquid surface is filled with liquid. This liquid that is located within the suction float or within the suction chamber can then be preferably extracted via the at least one extraction line.

It lies within the scope of the invention for the suction float provided with the float chamber to be provided at a spacing from and/or without contact with the bottom wall of the holding tank when the holding tank is in the normal use position. According to a preferred embodiment, this is achieved through the buoyancy of the float chamber. This embodiment is based on the discovery that solid components such as fecal matter itself and/or toilet paper, paper towels, or the like accumulate in the holding tank near the bottom wall and that, with a suction float that is located at a spacing from the bottom wall of the fecal tank when the holding tank is in the normal use position, comparatively clean liquid can be extracted from the holding tank while avoiding clogging and/or dirtying of the suction screen by solid components that are located in the holding tank. In principle, it is also possible for at least one spacer element to be provided on the side of the at least one suction float that faces toward the bottom wall of the holding tank, which, in particular, prevents the underside of the suction float and/or of the suction screen from coming into contact with the bottom wall of the holding tank if for example there is no liquid in the holding tank.

One especially preferred embodiment of the invention is characterized in that the proportion of the internal volume of the suction chamber to the internal volume of the float chamber is between 0.5 and 2.0, preferably between 0.7 and 1.8, more preferably between 1.0 and 1.6. Through the proportion of the internal volumes of the at least one suction chamber and of the at least one float chamber, it is possible to control the portion of the total height H or the volume fraction of the total internal volume of suction float by which the suction float projects from the liquid surface of the holding tank; in this context, it is preferably also possible to adjust the fill level or the filling volume of the suction chamber with liquid from the holding tank by way of the proportion of the internal volume of the suction chamber to the internal volume of the float chamber.

It is recommended that the proportion of the total internal volume of the suction float to the total internal volume of the holding tank be between 0.001 and 0.2, preferably between 0.005 and 0.1, more preferably between 0.01 and 0.05.

One especially recommended embodiment of the invention is characterized in that the suction screen has a base area or suction area of from 500 $cm^2$ to 4000 $cm^2$, preferably from 1000 $cm^2$ to 3500 $cm^2$, especially preferably from 1500 $cm^2$ to 3000 $cm^2$. In the context of the invention, the "base area" or "suction surface" of the suction screen refers particularly to the surface area of the suction screen through which liquid can penetrate or can be sucked into the suction chamber. Depending on the design of the suction float, the suction screen can be circular or round or rectangular, particularly square or the like. The "base area" or "suction surface" of the suction screen then refers to the surface content of the suction screen through which liquid can be sucked into the suction chamber. It was already noted above that the suction screen advantageously forms at least part of the wall of the suction chamber and/or of the suction float facing the bottom wall of the holding tank, with the suction screen especially preferably forming or substantially forming this wall. It is recommended that the holding tank or the bottom wall of the holding tank have a base area of from 10,000 $cm^2$ to 40,000 $cm^2$, preferably from 15,000 $cm^2$ to 35,000 $cm^2$, especially preferably from 20,000 $cm^2$ to 30,000 $cm^2$. In the context of the invention, "bottom wall of the holding tank" refers particularly to the bottom wall or the underside of the holding tank when the holding tank is in the normal use position. The holding tank can particularly have a rectangular or square or circular or round bottom wall surface or base surface.

According to an especially preferred embodiment of the invention, the proportion of the base area or suction area of the suction chamber to the base area of the holding tank is between 0.025 and 0.4, preferably between 0.05 and 0.3, more preferably between 0.05 and 0.2.

In principle, the dimensioning and the design of the at least one suction float and/or the holding tank depends on the number of sanitary fixtures and/or the duration of use of the holding tank. It also lies within the scope of the invention if a plurality of suction floats are provided in the holding tank, preferably as a function of the number of sanitary fixtures and/or the size of the holding tank.

In order to attain the inventive object, the invention also teaches a portable toilet with at least one stall, at least one sanitary fixture provided in the stall, and at least one holding tank, particularly a holding tank as described above, for receiving fecal matter and/or wastewater from the at least one sanitary fixture, at least one suction float is provided in the holding tank with at least one suction chamber and at least one suction screen, at least one extraction line for connecting to at least one suction pump is connected to the suction chamber, and liquid can be extracted from the holding tank by the suction float and/or by the extraction line and then used as a flushing fluid for at least one sanitary fixture of the portable toilet.

In the context of the invention, "portable toilet" refers particularly to a portable toilet with a chassis, with it being possible for the chassis to be connected to a motor vehicle and then transported to the place of use. The portable toilet can then be parked with the chassis by extendable legs or the like, for example, and later hitched to a motor vehicle and transported away. In principle, the portable toilet can also be a standard cabin according to ISO standards that is parked at the place of use without a chassis and later transported away.

It lies within the scope of the invention for at least one water closet to be provided in which the liquid or flushing fluid that is extracted from the holding tank is temporarily stored. In that case, each stall and/or each sanitary fixture of the portable toilet is especially preferably associated with at least one such water closet. The at least one water closet thus serves as a reservoir, as it were, for the liquid or flushing fluid that is extracted from the holding tank and ensures that a sufficient amount of the liquid is always available for the flushing of the at least one sanitary fixture. This also applies in particular to the embodiment in which each stall and/or each sanitary fixture is associated with at least one water closet.

The portable toilet advantageously has a service compartment in which the equipment required to operate the portable toilet are housed. Preferably, this equipment is not visible to the user. For example, the service compartment can be provided between a cubicle wall and an outer wall of the portable toilet and accessible from the outside of the portable toilet, for example through a flap or the like. The at least one water closet, the at least one suction pump and piping, switches and monitoring devices and the like can be accommodated in the service compartment, for example.

Moreover, it lies within the scope of the invention for the portable toilet to have at least two stalls. Especially preferably, the portable toilet according to the invention has two stalls. In principle, however, it also lies within the scope of the invention for the portable toilet to have more than two, for example three, four, or five stalls.

According to another recommended embodiment of the portable toilet according to the invention, a hand-washing device is provided in the at least one stall, preferably in each stall. In the context of the invention, "hand-washing device" refers particularly to a water faucet with a sink or drain provided thereunder. The hand-washing device is preferably used for cleaning the user's hands, for example after using the sanitary fixture of the portable toilet. It is advantageous if the at least one hand-washing device is supplied with fresh water from a clean-water tank. It is therefore recommended that the hand-washing device not be supplied with the liquid that is extracted from the holding tank, but rather preferably with clean water from at least one clean-water tank. It is advantageous for at least one clean-water pump to be provided in order to supply the fresh water. The clean-water tank and/or the clean-water pump are preferably provided in the service compartment of the portable toilet.

A very especially preferred embodiment of the portable toilet according to the invention is characterized in that at least one solar panel is provided on the outside of the container, preferably on the upper outer side of the portable toilet. The "upper side of the portable toilet" refers particularly to the container roof, and the at least one solar panel is preferably provided outside of the container on the container roof. In principle, the at least one solar panel can also be provided on the outside of the container on one of the side walls of the portable toilet. According to a highly preferred embodiment, the portable toilet according to the invention is supplied with power via the at least one solar panel in the normal use position. The "normal use position" of the portable toilet refers particularly to the condition of the portable toilet in which it is installed at the place of use and can be used. It is recommended that the at least one solar panel be connected to at least one standard battery or at least one rechargeable battery that is provided in or on the portable toilet, so that this battery can be charged by solar radiation and can then supply the portable toilet with power. It is possible for the battery to be provided in the service compartment of the portable toilet. The power supply is used particularly for the operation of at least one pump, that is, the at least one pump for the extraction of liquid from the waste container and/or for the operation of the at least one clean-water pump. In principle, other systems of the portable toilet that require power, such as lighting equipment, electric hand dryers, or the like, can be powered via the battery and/or the at least one solar panel. In this context, it lies within the scope of the invention if no additional power supply is required to operate the portable toilet. This embodiment is based on the discovery that the portable toilet can then be preferably operated autonomously or substantially autonomously. In particular, the supplying of power via the solar panel in combination with the extraction of liquid from the holding tank and the use of this liquid as a flushing fluid for at least one sanitary fixture of the portable toilet enables the portable toilet to be operated without the need for an external power connection, an external water connection, or a connection to a wastewater or sewage system. In this regard, the portable toilet can thus be operated for a certain period in a largely self-sufficient manner.

In order to attain the inventive object, the invention also teaches a method of recycling flushing water in a sanitary fixture, particularly in a portable toilet of the type described above, wherein the sanitary installation has at least one holding tank, particularly a holding tank of the type described above, wherein fecal matter and/or wastewater from at least one sanitary fixture of the sanitary installation is received in the holding tank, wherein at least one suction float with at least one suction chamber and at least one suction screen is provided in the holding tank, wherein at least one extraction line for connection to at least one suction pump is connected to the suction chamber, and wherein liquid is extracted from the holding tank by the suction float or by the extraction line, with at least one disinfectant being preferably added to the liquid for use as a flushing fluid, with the flushing fluid produced in this way being used to flush at least one sanitary fixture in the sanitary installation, and with the dirtied flushing water then being returned to the at least one holding tank.

According to an especially preferred embodiment of the method according to the invention, the disinfectant is hydrogen peroxide. It is preferably an aqueous hydrogen peroxide solution for which at least one disinfectant tank is advantageously provided in or on the portable toilet, especially preferably in the service compartment of the portable toilet. In principle, it also lies within the scope of the invention if other disinfectants, such as chlorine-containing disinfectants or the like, are added to the liquid that is extracted from the holding tank.

One highly recommended embodiment of the method according to the invention is characterized in that the solid components and/or the suspended particles present in the holding tank remain in the holding tank due to the filtering action of the suction screen during extraction of the liquid from the holding tank by the at least one suction float. Accordingly, it is preferred that only liquid or substantially only liquid be extracted from the holding tank by the at least one suction float.

It lies within the scope of the method according to the invention if the at least one disinfectant is added to the extracted liquid via a jet-pump nozzle. This addition of the at least one disinfectant to the extracted liquid can occur particularly on the path of conveyance from the holding tank to the at least one sanitary fixture and/or to the at least one water closet. In principle, however, it also lies within the scope of the invention if the at least one disinfectant is added to the liquid extracted from the holding tank in the water closet.

One embodiment of the invention is characterized in that the fill level of the holding tank and/or of the water closet and/or of the clean-water tank and/or of the disinfectant tank and/or the level or charging state of the battery is measured and/or detected and transmitted, particularly by SMS, to an operator, particularly to a service technician. Furthermore, alarm and/or error messages can be transmitted in this way.

Another embodiment of the invention is characterized in that the flushing water can be provided with at least one colorant, with the flushing water being preferably given a blue color through addition of this colorant. It also lies within the scope of the invention for fragrant aromas to be added to the flushing water. The at least one colorant and/or fragrant aromas can be added via a jet-pump nozzle and/or a metering pump, or they can be added directly.

The invention is based on the discovery that, by virtue of the inventive design of the holding tank, an advantageously long service life of the holding tank and/or of the portable toilet according to the invention is possible without intermediate emptying of the holding tank. This is particularly true in comparison to measures known from practice. Furthermore, by virtue of the special inventive design of the suction float, maintenance costs of the holding tank and/or of the portable toilet are surprisingly low, so the reliability of the holding tank and/or of the portable toilet is extremely high. It should also be noted that the portable toilet according to the invention can be operated largely autonomously at the place of use and only needs to be emptied and cleaned after removal from a service location. Furthermore, the energy requirement of the portable toilet according to the invention and of the holding tank according to the invention is extremely low compared to measures known from practice. Due to the special design of the suction float, the at least one suction pump in particular requires only a small amount of energy for extraction of the liquid from the holding tank. If the power is supplied according to the preferred embodiment of at least one solar panel, largely autonomous operation of the portable toilet according to the invention is possible. This is especially advantageous and renders the portable toilet particularly flexible. The method according to the invention is characterized in that flushing water can be recycled in a sanitary installation in a simple, functionally reliable, and economical manner, such that the method enables water-saving operation of sanitary installations with little effort. This is particularly advantageous from an ecological point of view, since the sanitary fixtures are flushed with recycled water, so no clean fresh water has to be used for flushing. The inventive recycling of the flushing water also makes an advantageously long service life of the portable toilets and/or holding tanks possible without intermediate emptying and/or maintenance, and this is associated with little effort and expense. In particular, pronounced dirtying or clogging of the suction float or suction screen can be almost completely avoided with the measures according to the invention. The method also satisfies all hygienic requirements. In summary, it should be noted that both the holding tank according to the invention and the portable toilet according to the invention and the method according to the invention are characterized by simplicity, little effort and, in particular, low cost.

BRIEF DESCRIPTION OF THE DRAWING

The invention is explained below in greater detail with reference to an embodiment. In the schematic drawing.

SPECIFIC DESCRIPTION OF THE INVENTION

Figure 1:
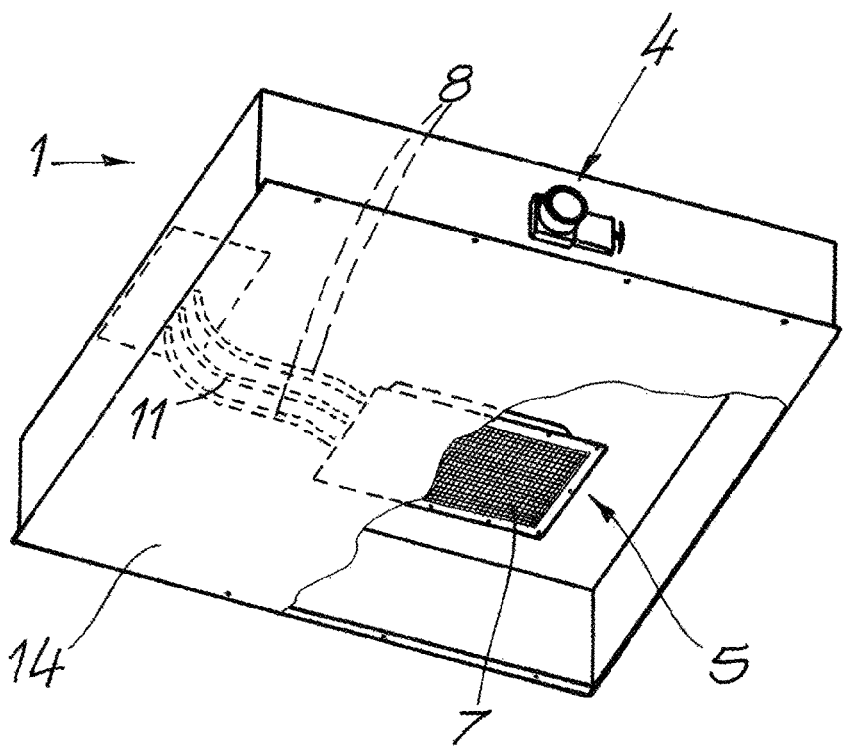
FIG. 1 is a perspective, partially sectional bottom wall view of a holding tank according to the invention.
Figure 2:
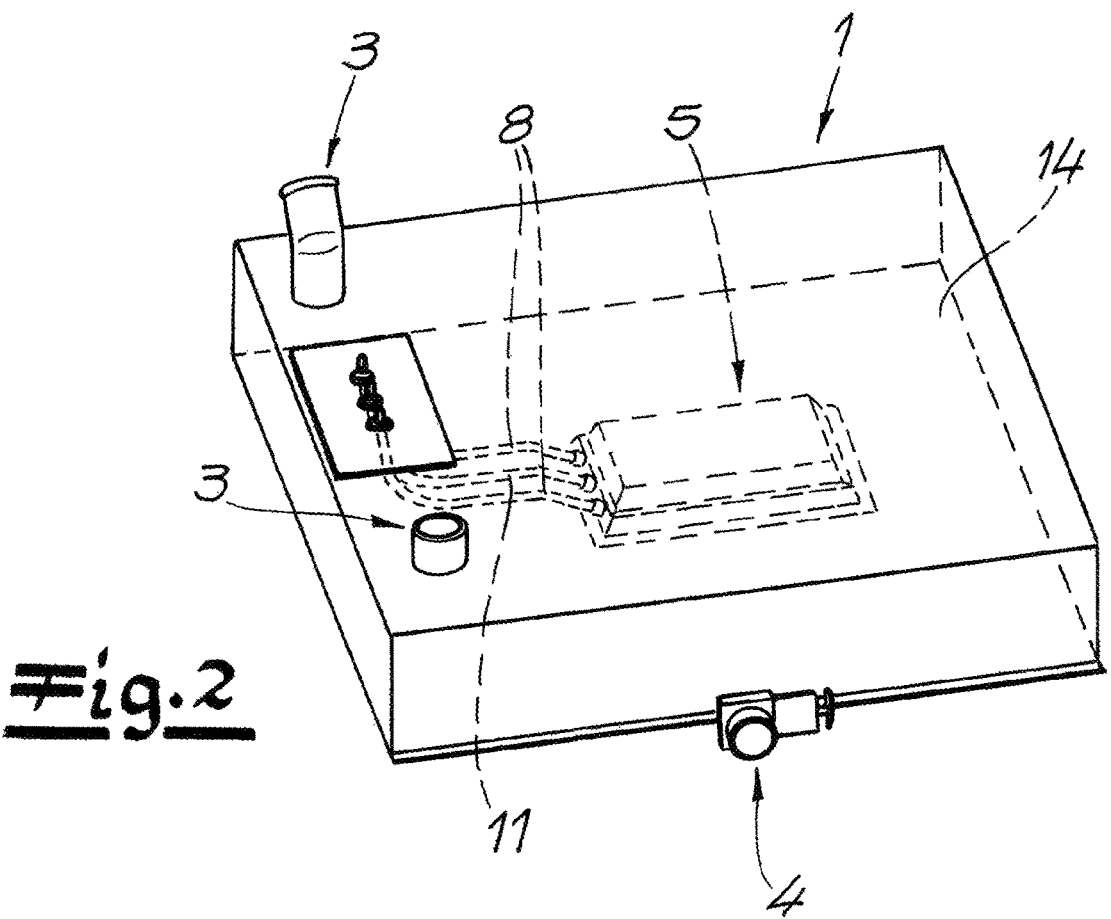
FIG. 2 shows the tank as in FIG. 1 in a perspective top view.

FIGS. 1 and 2 show a holding tank 1 according to the invention for a sanitary installation. Advantageously and in this embodiment, the holding tank 1 has two inlets 3 as shown particularly in FIG. 2. The inlets 3 connect to at least one sanitary fixture of the sanitary installation, and fecal matter and/or wastewater flow through these inlets 3 from the sanitary fixture into the holding tank 1. Recommendably and here, the bottom wall 14 of the holding tank 1 has an area of from 10,000 $cm^2$ to 40,000 $cm^2$. Here, the base surface and/or the bottom wall 14 of the holding tank is rectangular and may have a base area of for example 25,000 $cm^2$. The holding tank 1 shown in the drawing also has an outlet 4 that preferably serves for emptying the holding tank 1. According to the invention, at least one suction float 5 is provided in the holding tank 1. Preferably and here, exactly one suction float 5 is provided in the holding tank 1. According to the invention and here, the suction float 5 has a suction chamber 6 and a suction screen 7. At least one suction line 8 is connected, here preferably at least two suction lines 8 are connected to the suction chamber 6 for connection to at least one suction pump shown schematically at P. It lies within the scope of the invention if the sanitary installation is a portable toilet 9 (FIGS. 4 and 5) and if the portable toilet 9 preferably has at least one stall 10. According to an especially preferred embodiment, a separate extraction line is connected to the suction chamber 6 of the suction float 5 for each stall 10 of the portable toilet 9 and/or for each sanitary fixture 2. The suction float 5 and/or the extraction lines 8 can extract liquid from the holding tank 1, and this liquid is used as flushing fluid for at least one sanitary fixture of the sanitary installation. Advantageously and here, a flush line 11 is connected to the suction chamber 6 of the suction float 5 and preferably serves the function of feeding water into the holding tank 1 and/or the suction chamber 6 and thereby backflushing the suction screen 7. Advantageously and here, the suction screen 7 forms the wall of the suction float 5 that faces toward the bottom wall 14 of the holding tank 1 when the holding tank is in the normal use position 1. According to a recommended embodiment of the invention and here, the suction screen 7 is a close-meshed wire mesh and has a mesh size of from 0.1 mm to 5.0 mm. Here according to FIGS. 1 and 3, the suction screen 7 may have a mesh size of about 0.5 mm. The base area or suction surface of the suction screen 7 is advantageously 500 $cm^2$ to 4000 $cm^2$. Here according to the drawing, the base area or suction surface of the suction screen 7 may be approximately 2500 $cm^2$. In this context, the "base area" or "suction surface" of the suction screen refers 7 particularly to the surface area of the suction screen through which liquid can penetrate or be sucked into the suction chamber 6.

Figure 3:
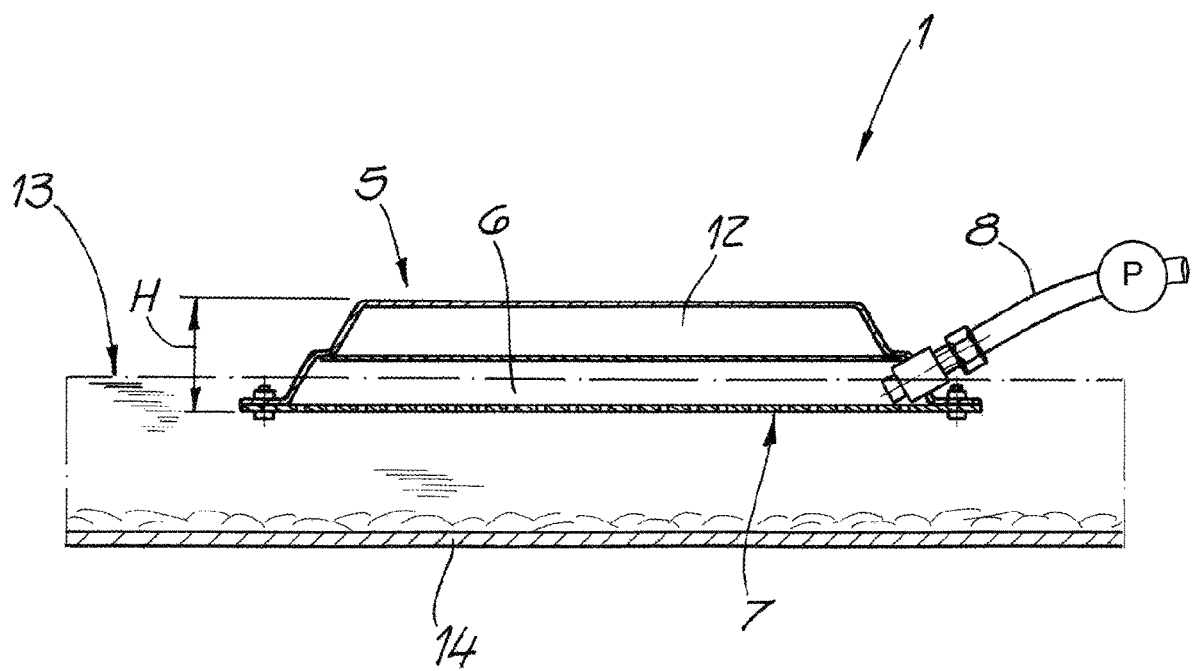
FIG. 3 is a sectional side view of a suction float according to the invention.

FIG. 3 shows the suction float 5 according to the invention with the suction chamber 6 and screen 7 as well as the extraction line 8 that is connected to the suction chamber 6 that is advantageously connected to the suction pump P. Here according to FIG. 3, the suction screen 7 forms the lower wall of the suction float 5 that faces toward the bottom wall 14 of the holding tank 1. According to an especially preferred embodiment of the invention and here, the suction float 5 has a float chamber 12 that, especially preferably and here, is filled with air.

Advantageously, the float chamber 12 is spatially separated from the suction chamber 6 and here according to the drawing is provided above the suction chamber 6 with respect to the bottom wall 14 and a liquid surface 13 of the holding tank 1 and separated by a wall from the suction chamber 6. Recommendably and here, the float chamber 12 is dimensioned such that, when the holding tank 1 is in the operational position, the suction float 5 projects upward above the liquid surface 13 of the holding tank 1 by from 35% to 80% of its total height H and/or with a proportion of from 35% to 80% of its total internal volume. Here according to FIG. 3, the portion of the total height H protruding from the liquid surface 13 of the holding tank 1 may be about 60% to 70%. "Overall height H" refers particularly to the greatest dimension of the suction float 5 perpendicular to the bottom wall 14 and/or to the liquid surface 13 of the holding tank 1. In FIG. 3, this height H is, accordingly, the spacing from the suction screen 7 to the upper surface of the float chamber 12. The suction float 5 is thus preferably given buoyancy by the float chamber 12.

Advantageously and here, this means that at least part of the float chamber 12 is above the liquid surface 13 of the holding tank 1 and at least part of the suction chamber 6 is below the liquid surface 13. Liquid can penetrate through the suction screen 7 into the suction chamber 6, and this liquid can be extracted via the extraction line(s) 8. According to a recommended embodiment of the invention and here, the suction float 5 provided with the float chamber 12 is provided at a spacing from and/or without contact with the bottom wall 14 of the holding tank 1 when the holding tank 1 is in the normal use position. This can be seen particularly in FIG. 3. This embodiment is based on the discovery that the solid components located in the holding tank increasingly accumulate near the bottom wall and, by floating the suction float 5 at a spacing from and/or without contact with the bottom wall 14, solids cannot be sucked up and/or the solid components can be prevented from clogging and/or dirtying the suction screen 7. The buoyancy described above is preferably influenced by the proportion of the internal volume of the suction chamber 6 to the internal volume of the float chamber 12, and it is recommended that this proportion be between 1.0 and 1.6 here. It is recommended that the total internal volume of the suction float 5 be between 0.001 and 0.2 the total internal volume of the holding tank. Here, the proportion may be about 0.025 (FIGS. 1 and 2). The "total internal volume of the holding tank 1" refers to the capacity of the holding tank and "total internal volume of the suction float" refers to the total internal volume of the float chamber 12 and the suction chamber 6. The total internal volume or capacity of the holding tank may be about 500 to 700 L here.

Figure 4:
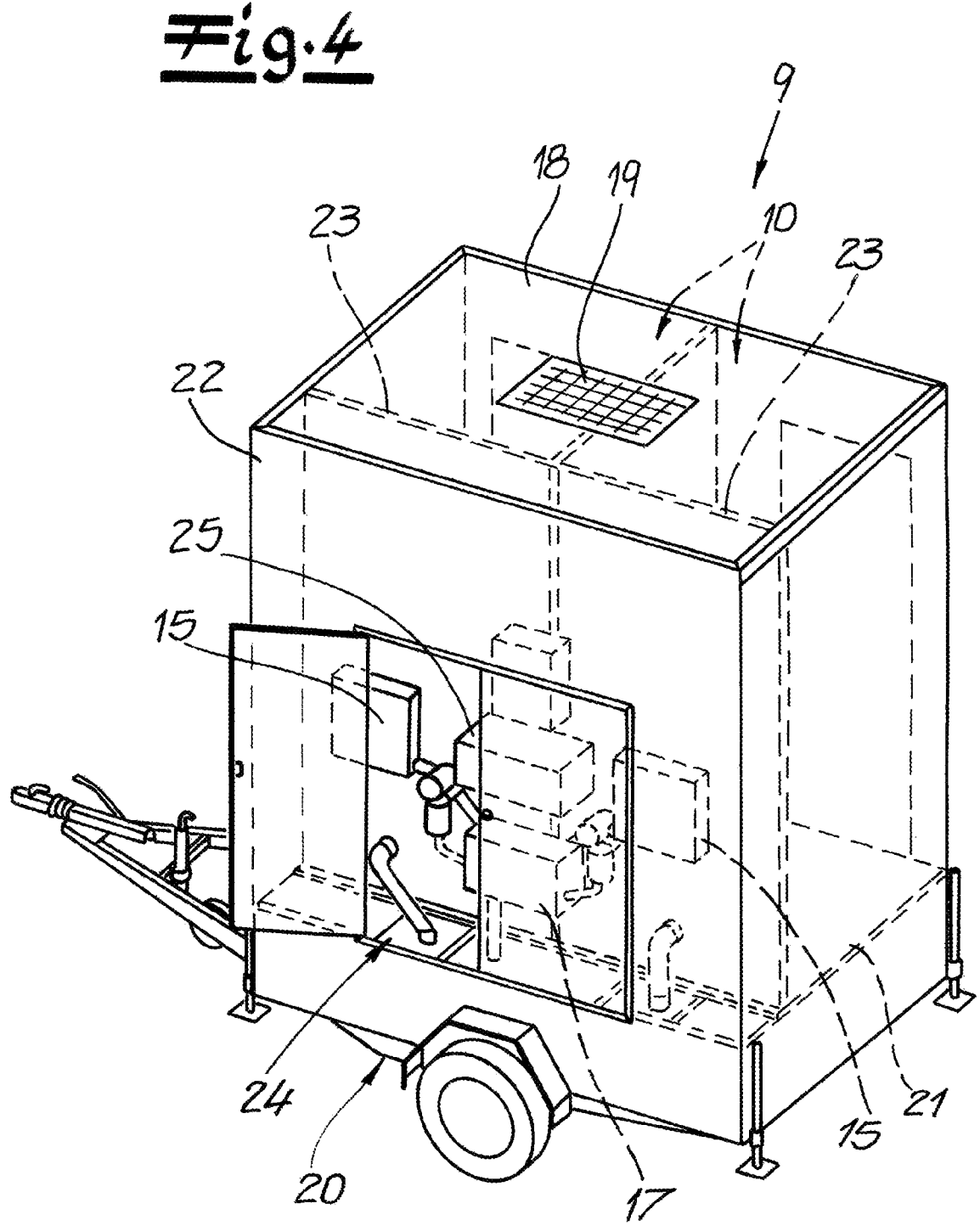
FIG. 4 is a perspective view of a portable toilet according to the invention.
Figure 5:
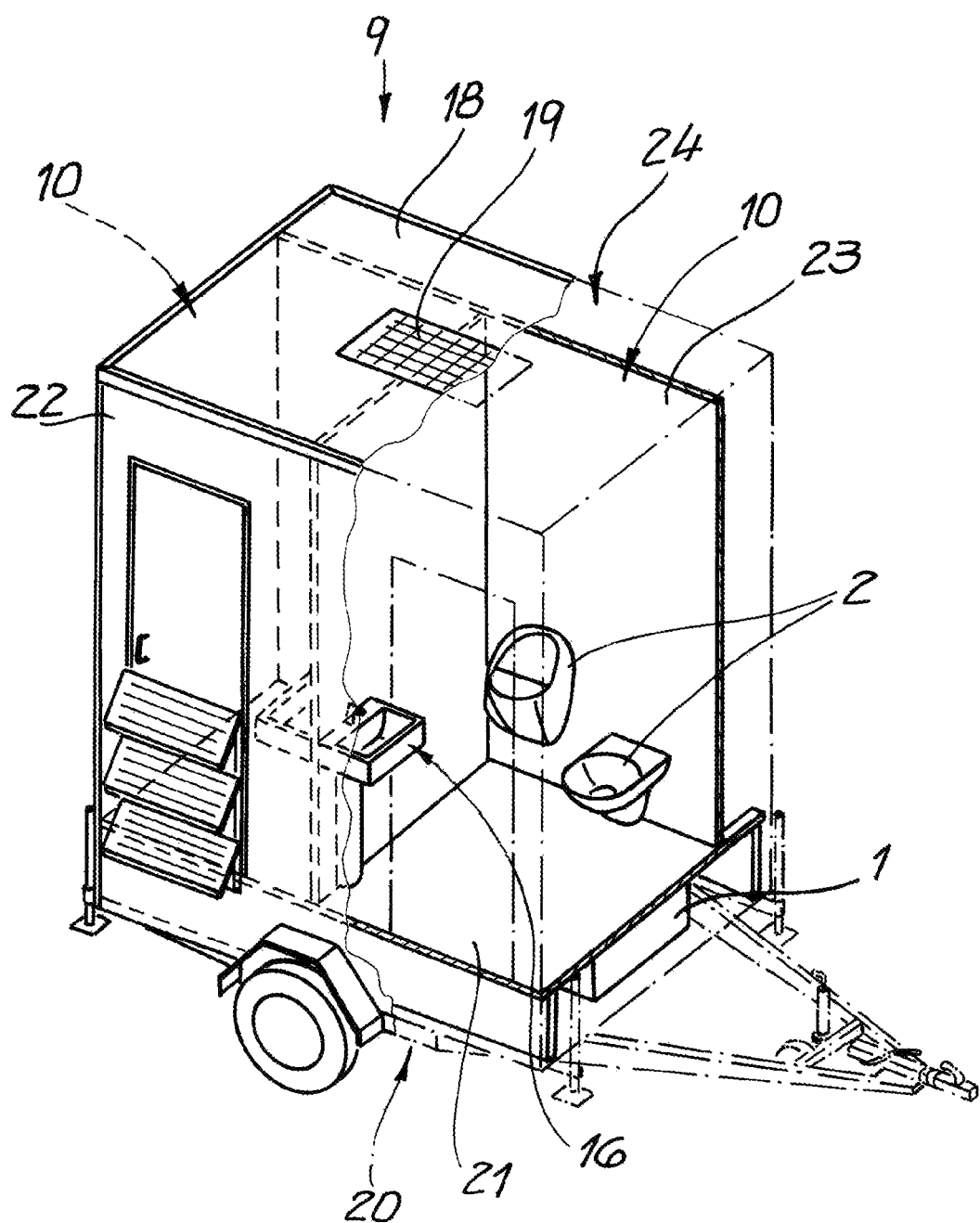
FIG. 5 is a partly sectional perspective view from the other side of the object according to FIG. 4.

FIGS. 4 and 5 show the portable toilet 9 according to the invention. Preferably, and according to the embodiment of FIGS. 4 and 5, the portable toilet 9 is on a chassis and can be hitched as such to a motor vehicle, transported to the place of use, and parked there along with the chassis. Preferably and here, the portable toilet 9 has two stalls 10, and respective sanitary fixtures 2 are provided in the stalls 10. It can be seen particularly in FIG. 5 that a urinal and a toilet bowl are provided in one of the stalls 10. Preferably and here, one of the stalls 10 is provided for male users and one of the stalls 10 for female users. The portable toilet 9 according to the invention has at least one holding tank that here is provided below the housing and in the space between the chassis 20 and housing floor 21. Preferably and here, this holding tank is a holding tank 1 as described above. Especially preferably and here, a service compartment 24 is provided between an outer wall or side wall 22 of the portable toilet 9 and the cubicle side walls or cubicle rear walls 23 associated with this side wall in which the equipment required for operating the portable toilet is preferably provided. According to a preferred embodiment of the invention and here, two water closets 15 are provided in which the liquid or flushing fluid extracted from the holding tank 1 is stored. Recommendably and here, each stall 10 of the portable toilet 9 is associated with a water closet 15. Advantageously and here, these water closets 15 are provided in the service compartment 24. It can also be seen in FIGS. 4 and 5 that a hand-washing device 16 is preferably provided in each stall 10, and these hand-washing devices are especially preferably supplied with fresh water from a clean-water tank 17.

According to a highly recommended embodiment of the invention and here according to FIGS. 4 and 5, at least one solar panel 19 is provided outside of the container on the upper side 18 of the portable toilet 9 and/or on the container roof. This solar panel 19 is advantageously connected to a standard battery 25 and/or to a rechargeable battery, and this battery and/or rechargeable battery 25 is charged as a result of solar radiation incident on the solar panel 19. Preferably and here, the battery 25 is housed in the service compartment 24. The portable toilet 9 can be supplied with power by the battery 25; in particular, the suction pump P can be supplied with power by the battery 25. Recommendably, no additional power is then required to operate the portable toilet 9, so that the portable toilet 9 can be operated in a largely autonomous manner for a certain period of time. It lies within the scope of the invention if other systems of the portable toilet, such as the clean-water pump, lighting, or the like, are supplied with power by the battery 25 and/or by the solar panel 19. FIG. 4 also shows that the service compartment 24 can be preferably accessed from outside the container through a flap.

The invention claimed is:

1. In combination with a sanitary installation carrying a sanitary fixture, a holding tank for receiving fecal matter and wastewater from the sanitary fixture of the sanitary installation, the tank comprising:
    an inlet; an outlet;
    a suction screen downwardly delimiting a suction chamber;
    a float in the holding tank floating on the liquid therein and above the screen, the suction chamber opening downward through the suction screen into the tank;
    a suction pump; and
    an extraction line connected to the suction pump and opening into the liquid in the suction chamber for withdrawing the liquid from the holding tank through the suction float and for recycling the extracted liquid for use as a flushing fluid for the sanitary fixture of the sanitary installation.

2. The combination according to claim 1, wherein the sanitary installation is a portable toilet having a plurality stalls each holding a respective one of the sanitary fixtures, a respective such extraction line being connected to the suction chamber of the suction float for each stall of the portable toilet or for each sanitary fixture.

3. The combination according to claim 1, further comprising:
    at least one flush line connected to the suction chamber of the suction float.

4. The combination according to claim 1, wherein the suction screen has a mesh size of from 0.1 mm to 5.0 mm.

5. The combination according to claim 1, wherein the suction float is a float chamber filled substantially with air.

6. The combination according to claim 5, wherein the float chamber is formed such that, when the holding tank is in a normal use position, the suction float projects with a proportion of from 5% to 95% of its total height from a surface of the liquid in the holding tank.

7. The combination according to claim 5, wherein the suction float provided with the float chamber is provided at a spacing from or without contact with a bottom wall of the holding tank when the holding tank is in a normal use position.

8. The combination according to claim 5, wherein a proportion of an internal volume of the suction chamber to an internal volume of the float chamber is between 0.5 and 2.0.

9. The combination according to claim 5, wherein a proportion of a total internal volume of the suction float to a total internal volume of the holding tank is between 0.001 and 0.2.

10. The combination according to claim 1, wherein the suction screen has a base area or suction area of from 500 $cm^2$ to 4000 $cm^2$.

11. The combination according to claim 1, wherein a bottom wall of the holding tank has a base area of from 10,000 $cm^2$ to 40,000 $cm^2$.

12. The combination according to claim 1, wherein a proportion of a base area or suction surface of the suction screen to a base area of the holding tank is between 0.025 and 0.4.

13. A portable toilet comprising:
   a stall;
   a sanitary fixture in the stall;
   a holding tank receiving fecal matter or wastewater from the a sanitary fixture;
   a suction float floating in the holding tank; and
   a suction chamber on the float and opening downward into the tank through a suction screen;
   a suction pump; and
   a extraction line connected to the suction pump and opening into the suction chamber such that liquid can be extracted from the holding tank through the suction float by the extraction line for recycling and use as a flushing fluid for the sanitary fixture of the portable toilet.

14. The portable toilet according to claim 13, further comprising:
   a water closet in which liquid extracted from the holding tank is stored, each stall or each sanitary fixture of the portable toilet being associated with a respective water closet.

15. The portable toilet according to claim 13, further comprising:
   a hand-washing device in the a stall and supplied with fresh water from a clean-water tank.

16. The portable toilet according to claim 13, further comprising:
   a solar panel on an upper side of the portable toilet.

17. The portable toilet according to claim 16, wherein the portable toilet is supplied with power via the a solar panel, and no additional power supply is required to operate the portable toilet in normal use.

18. A method of operating a portable toilet having a holding tank receiving fecal matter or wastewater from a sanitary fixture, the method comprising the steps of:
   floating a suction float with a downwardly open suction chamber in the holding tank;
   drawing liquid through a suction screen from the holding tank into the suction chamber;
   extracting the drawn-in liquid through an extraction line connectable to a suction pump from the suction chamber and the holding tank and through the floating suction float and recycling the extracted liquid as flushing water to the sanitary fixture;
   adding a disinfectant to the flushing water; and
   returning the flushing water from the sanitary fixture to the holding tank.

19. The method according to claim 18, further comprising the step of:
   separating solid components or suspended particles present in the holding tank in the holding tank by the suction screen during extraction of the liquid from the holding tank through the a suction float.

20. The method according to claim 18, wherein the disinfectant is added by a jet-pump nozzle.

* * * * *